United States Patent
Yellin et al.

(10) Patent No.: US 6,870,890 B1
(45) Date of Patent: Mar. 22, 2005

(54) POWER SAVING IN COMMUNICATION TERMINALS

(75) Inventors: Daniel Yellin, Raanana (IL); Sharon Levy, Tiberias (IL); David Ben-Eli, Modi'in (IL); Jacob Pick, Givataim (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/387,310

(22) Filed: Aug. 31, 1999

(51) Int. Cl.[7] .............................................. H04L 27/06
(52) U.S. Cl. ..................... 375/340; 340/7.33; 455/343.2
(58) Field of Search ............... 455/343.1, 343.2, 455/343.3, 343.4; 370/311; 340/7.28, 7.32, 7.33, 7.34, 7.35; 714/774; 375/340, 341, 316

(56) References Cited

U.S. PATENT DOCUMENTS

| | | | | |
|---|---|---|---|---|
| 5,265,270 A | * | 11/1993 | Stengel et al. ........... | 455/343.2 |
| 5,471,655 A | * | 11/1995 | Kivari ..................... | 455/127.5 |
| 5,930,706 A | * | 7/1999 | Raith ....................... | 455/422.1 |
| 5,983,383 A | * | 11/1999 | Wolf ........................... | 714/755 |
| 6,205,186 B1 | * | 3/2001 | Butler et al. ................. | 375/341 |
| 6,243,568 B1 | * | 6/2001 | Detlef et al. ............. | 455/226.4 |
| 6,272,651 B1 | * | 8/2001 | Chin et al. ..................... | 714/43 |
| 6,282,250 B1 | * | 8/2001 | Lundby ...................... | 375/340 |
| 6,301,684 B1 | * | 10/2001 | Watanabe et al. ........... | 375/341 |
| 6,567,390 B1 | * | 5/2003 | Banister et al. ............. | 375/262 |

OTHER PUBLICATIONS

Forney, G. D., Jr. (1972); "Maximum Likelihood Sequence Estimation of Digital Sequences in the Presence of Intersymbol Interference"; IEEE Trans. Inform. Theory, vol. IT–18, pp. 363–378; May.

Clark, G. C. & Bibb CAIN, J; Error–Correction Coding for Digital Communications; Plenum Press; 1988, Chap. 6.2.

* cited by examiner

*Primary Examiner*—Don N. Vo
(74) *Attorney, Agent, or Firm*—Eitan, Pearl, Latzer & Cohen Zedek, LLP

(57) ABSTRACT

A method of receiving messages by a communication terminal. The method includes receiving symbols of a frame of a transmitted encoded message, and decoding the frame based on fewer received symbols than the number of symbols in the frame.

31 Claims, 4 Drawing Sheets

POWER SAVING IN COMMUNICATION TERMINALS

FIELD OF THE INVENTION

The present invention relates to communication terminals such as cellular phones and pagers and in particular to methods for receiving and decoding messages by communication terminals.

BACKGROUND OF THE INVENTION

Messages transmitted to cellular phones are encoded in order to reduce the chances that noise will corrupt the message. The message comprise a plurality of bits which are either '0' or '1'. The encoding of the message usually includes adding redundancy (i.e., making the encoded message longer than the original message), involving symbol dependency (i.e., making the value of each symbol in the encoded message a function of a plurality of bits in the original message) and interleaving the message (i.e., mixing the order of the symbols in the encoded message).

Normally, each symbol in the received message is represented in the receiver, before decoding, by a word which represents the chance that the symbol is a logical "1". A high positive value of the word means that the symbol is a logical '1' with high confidence, while a negative value with a high absolute value means the symbol is a logical '0' with high confidence. A word with a zero value means that the symbol is a '0' or '1' with equal probability. This representation is referred to herein as soft data.

The decoding of the message is usually performed by finding an original message which would result in the received encoded message with the highest probability. Due to the interleaving and the interdependence of the symbols of the encoded message the decoding process does not usually begin before the entire message, or an entire frame of a predetermined length, was received. If the message were not interleaved some decoding schemes would allow the decoding to begin before the entire message was received and end when the entire message is received. However, such schemes usually have a reduced performance, i.e., a higher rate of failures in correctly decoding the message, in particular in fading channels as often encountered in practice.

The messages usually include an error detection code which is used to determine whether the message was properly decoded. One such code is the cyclic redundancy code (CRC).

Most cellular phones operate on rechargeable batteries which provide power for their operation. Some cellular systems reduce the rate at which the cellular phones consume the battery power by having the phones operate in an idle mode when they are open for receiving calls but are not transmitting or receiving audio data. Generally, in the idle mode, the cellular phones deactivate most of their components to reduce their current consumption. Periodically, for example once every two seconds, the cellular phones activate all their components, for a short wake up period during the idle mode. A base station of the system sends a broadcast or paging message to the cellular phones on a paging channel, notifying them whether they are to remain in the idle mode or they are to change to a reception mode, for example in order to receive an incoming call.

The wake up period of a cellular phone comprises a warm-up period, a reception period, a decoding period and a shut down period. In the wake up period the cellular phone activates all of its components in order to receive the message. If the message tells the cellular phone to remain in the idle mode, the cellular phone shuts down most of its components during the shut down period. Any reduction in the length of the wake up period results in an increase in the time a cellular phone may be used without recharging or replacing its batter.

SUMMARY OF THE INVENTION

An aspect of some preferred embodiments of the invention to relates to reducing the average current consumption of a communication terminal during an idle mode.

An aspect of some preferred embodiments of the present invention relates to decoding at least some of the encoded messages received by a communication terminal using only part of the received message rather than using the entire received message. Such decoding uses only part of the redundancy in the encoded message. Preferably, the decoding is performed before the entire message is received, thus reducing the reception time of the message.

In a preferred embodiment, attempts to decode the message are performed more than once using increasing lengths of the message. The attempts to decode the message are repeated using larger parts of the message until the message is successfully decoded or until the entire message is used in the decoding. Thus, there is no reduction in successful decoding rates due to the reduction in the reception time. In this embodiment, the communication terminal preferably continues to receive the remainder of the message while performing the decoding.

Alternatively or additionally, the last decoding in a succession of decodings uses less than the entire message or only a single decoding is performed using less than the entire received message. The possible reduction in successful decoding rates in this embodiment is worth the reduction in the reception time of the messages. In this embodiment, the length of the part used in decoding the received message is preferably chosen at a compromise between reducing the reception time and successfully decoding the message. In a preferred embodiment, the length of the part used in decoding is chosen so as to achieve a desired rate of successful decodings which is above the minimal allowed rate of the system in which the communication terminal is used.

An aspect of some preferred embodiments of the present invention relates to using parts of different lengths in decoding different types of received messages. In a preferred embodiment of the present invention, audio messages are decoded using the entire received message while control and/or paging messages are decoded using only a part of the received messages. The length of the part of the message used in the decoding affects the reception time and the chances of correctly decoding the message. Using a shorter part of the received message in decoding shortens the reception time. On the other hand, decoding using a shorter part of the message means the decoding is performed with less information and therefore, the chances of successful decoding are reduced. The reception time of audio messages is usually less important than high decoding success and therefore audio messages are preferably decoded using the entire encoded message. In addition, the time assigned for decoding of audio messages is usually fixed and there is substantially nothing to gain in decoding some of the messages using less than the total assigned time. In contrast, there is much to gain in reducing the reception time of messages, after which the communication terminal usually shuts down, e.g. control and paging messages. By reducing the reception time of these messages the current consumption of the communication terminal is reduced. This gain is usually worth while even if it results in some reduction in the successful decoding rate. In addition, this gain is worth while even if the gain is achieved only for some of the received messages.

An aspect of some preferred embodiments of the present invention relates to adaptively adjusting the length of the message part used in decoding, according to the state of the channel on which the messages are transmitted. In a preferred embodiment of the present invention, the communication terminal estimates the signal to noise ration (SNF) of the channel and accordingly determines the length of the message part used in decoding.

Alternatively or additionally, the communication terminal determines the length of the part used in decoding according to the performance of the terminal in previous decodings. In a preferred embodiment, the length of the part used in decoding is adjusted based on the percentage of unsuccessful previous decodings. Preferably, when the percentage of unsuccessful decodings passes a predetermined threshold the part used in decoding is lengthened.

Further alternatively or additionally, the length of the part used in decoding is adjusted according to a success margin of one or more previous decodings. Preferably, when the one or more previous decodings achieved successful decodings with a relatively high confidence, the length of the part used in decoding is reduced.

In some preferred embodiments of the present invention, the decoding process must receive values for all the symbols of the message. Preferably, those symbols which are not in the part used in decoding are represented by assumed a priori values. Preferably, if part or all of most of the received messages have the same contents, these contents are used as the a priori values. Alternatively or additionally, at least some of the symbols not in the message part used in decoding are represented by a zero value which means that the value of the symbol is unknown.

An aspect of some preferred embodiments of the present invention relates to changing symbol and/or bit values of a received message in order to raise the chances of successfully decoding the received message is of an expected type.

In a preferred embodiment of the present invention, the changing of the values is performed on the received symbol values before the decoding is performed. Alternatively or additionally, the bit values are changed after the decoding is performed. In a preferred embodiment of the present invention, fields which have known values in the expected message type are given these known values regardless of the received values of the fields. Approximately, the changes are performed responsive to the received values. In a preferred embodiment, changes are made only when the changes affect the received message to a predetermined or adaptively determined extent.

There is therefore provided in accordance with a preferred embodiment of the present invention, a method of receiving messages by a communication terminal, including receiving symbols of a frame of a transmitted encoded message, and decoding the frame based on fewer received symbols than the number of symbols in the frame.

Preferably, the decoding includes decoding based on the received symbols and assumed values of symbols not received.

Preferably, the assumed values include values which indicate that no knowledge is available about the symbols. Alternatively or additionally, the assumed values include values of a message which is expected with a substantial probability. Preferably, the assumed values include values of a message for which early decoding is advantageous.

Preferably, receiving fewer than all the symbols includes receiving symbols of a message which is either a message indicating that the communication terminal should move to a sleep condition or a message which indicates that the communication terminal should remain in a wake condition, and the assumed values include values of the message indicating that the communication terminal should move to the sleep condition.

Preferably, receiving fewer than all the symbols includes receiving symbols over a paging channel. Preferably, receiving fewer than all the symbols includes receiving symbols of a message which, in a substantial probability, indicates that the communication terminal should move to a sleep condition.

Preferably, receiving the symbols includes receiving fewer than the number of symbols in the frame. Preferably, the decoding is completed before receiving all the symbols in the frame. Further preferably, the decoding is performed using a predetermined number of received symbols.

Preferably, the decoding is performed using an adaptively adjusted number of received symbols. Preferably, the decoding includes decoding using a number of received symbols adjusted responsive to an estimate of the quality of a channel over which the message is received. Preferably, decoding using the adaptively adjusted number of symbols includes decoding using a number of received symbols adjusted responsive to a rate of decoding successes of previously received messages. Alternatively or additionally, the decoding includes decoding using a number of received symbols adjusted responsive to a confidence margin of one or more previous decodings. In a preferred embodiment, the decoding includes decoding using the lowest number of received symbols which ensures a predetermined rate of success in decoding the message.

Preferably, the method includes receiving symbols of the frame while decoding the message. Preferably, the method includes decoding the frame a second time using more received symbols than used in the previous decoding. Preferably, decoding the frame the second time is performed only if the first decoding failed. Preferably, decoding the frame the second time includes using a number of received symbols determined responsive to results of the previous decoding.

Preferably, receiving the symbols includes receiving during an idle mode of the communication terminal.

There is further provided in accordance with a preferred embodiment of the present invention, a method of receiving messages by a communication terminal, including receiving symbols of a frame of an encoded message over a transmission channel, determining a number of received symbols to be used in decoding the frame, the determined number being fewer than the number of symbols in the frame for at least some of the received messages, and decoding the frame using the determined number of received symbols.

Preferably, determining the number of received symbols includes determining the number of received symbols responsive to the channel on which the symbols are received. Alternatively or additionally, determining the number of received symbols includes determining the number of received symbols responsive to whether the communication terminal is in idle mode. Further alternatively or additionally, determining the number of received symbols includes determining the number of received symbols responsive to success rates in decoding previously received frames. Further alternatively or additionally, determining the number of received symbols includes determining the number of received symbols responsive to success rates in decoding previously received frames. Preferably, determining the number of received symbols includes determining fewer than a total number of symbols in the frame.

There is further provided in accordance with a preferred embodiment of the present invention, a receiver, including an input interface which receives symbols of a frame of a transmitted encoded message, a decoder which decodes the frame based on at least some of the received symbols, and a controller which determines how many of the received symbols of the frame are used in decoding the frame, the determined number being fewer than the number of symbols in the frame for at least some of the decoded frames.

Preferably, the receiver includes a filler unit which provides padding symbols to the decoder in order to complete the received symbols to a complete frame.

There is further provided in accordance with a preferred embodiment of the present invention, a method of providing a decoding a message, including receiving encoded symbols of a frame of a transmitted encoded message, altering the values of at least one of the received symbols of the frame, and decoding the frame based on the altered values.

Preferably, receiving the encoded symbols includes receiving fewer than the number of symbols in the frame.

Preferably, altering the values of at least one of the symbols includes altering the values so as to correspond to values of an expected message type. Preferably, altering the values of at least one of the symbols includes altering irrespective of the received values. Alternatively, altering the values of at least one of the symbols includes altering responsive to the received values. Preferably, the received encoded symbols include soft data and altering the values of at least one of the symbols includes raising the confidence values of symbols whose values coincide with values of an expected message type and/or lowering the confidence values of symbols whose values do not coincide with values of an expected message type.

Preferably, altering the values of at least one of the symbols includes altering the values provided the frame is altered less than an allowed extent. Preferably, altering the values of at least one of the symbols includes determining a number of symbols which are to be altered and altering the frame only if the determined number of symbols is lower than an allowed number.

Preferably, the method includes checking the decoded frame based on an error detection code to determine whether the decoding was successful. Preferably, the method includes performing an additional decoding attempt if the decoding was not successful. Preferably, the additional decoding attempt is performed without altering values of any of the symbols.

There is further provided in accordance with a preferred embodiment of the present invention, a method of providing a decoded value of a received message, including receiving encoded symbols of a frame of a transmitted encoded message, decoding the frame based on at least some of the received encoded symbols, so as to provide decoded bits, altering the values of at least one of the decoded bits of the frame, and providing decoded values of the bits of the frame including the altered values.

Preferably, receiving the encoded symbols includes receiving fewer than the number of symbols in the frame.

Preferably, altering the values of at least one of the bits includes altering the values so as to correspond to values of an expected message type. Preferably, altering the values includes altering irrespective of the values of the decoded bits. Alternatively, altering the values includes altering responsive to the values of the decoded bits. Preferably, altering the values includes altering the values provided the frame is altered less than an allowed extent.

Preferably, altering the values includes determining a number of bits which are to be altered, and altering the frame only if the determined number of bits is lower than an allowed number.

Preferably, the method includes checking the provided decoded values based on an error detection code to determine whether the decoding was successful. Preferably, the method includes performing an additional decoding attempt if the decoding was not successful. Preferably, the additional decoding attempt is performed without altering values of any of the bits.

BRIEF DESCRIPTION OF FIGURES

The invention will be more clearly understood by reference to the following description of preferred embodiments thereof in conjunction with the figures, in which.

DETAILED DESCRIPTION OF THE PREFERRED EMBODIMENTS

Figure 1:
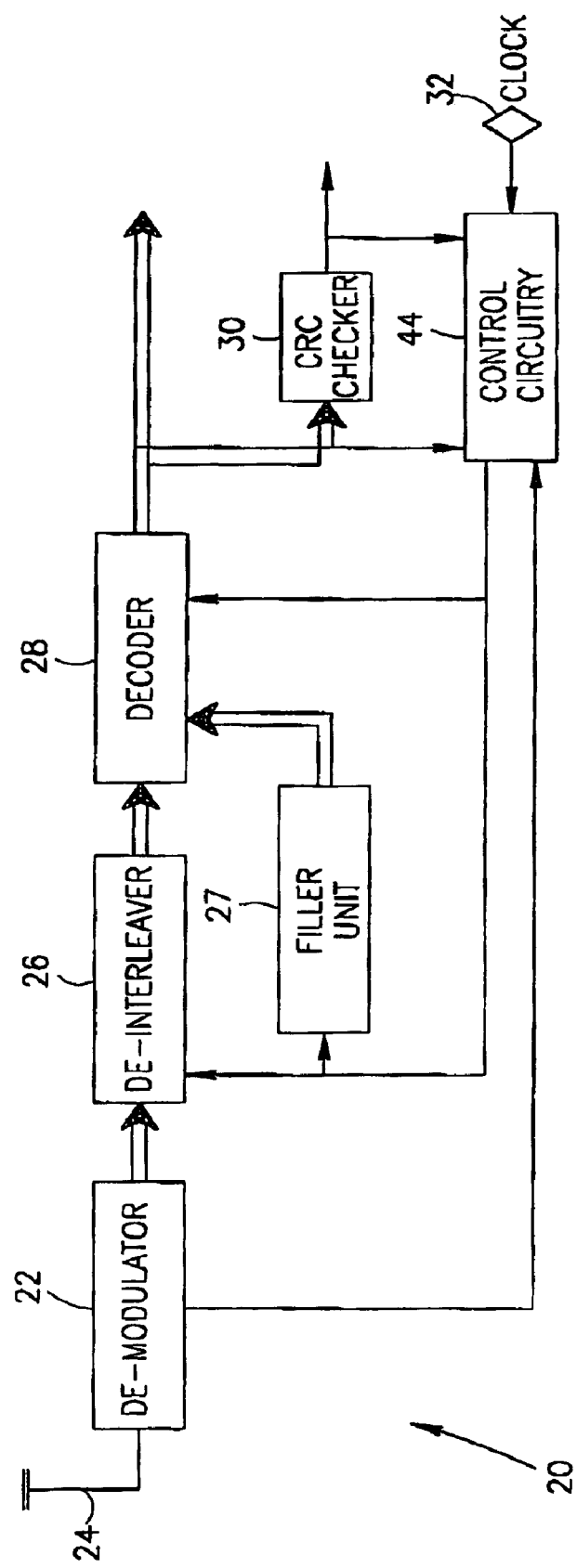
FIG. 1 is a simplified schematic illustration of a receiver, in accordance with a preferred embodiment of the present invention.

FIG. 1 is a simplified schematic illustration of a receiver 20 belonging to a communication terminal, in accordance with a preferred embodiment of the present invention. Receiver 20 comprises a de-modulator 22 which receives frames of transmitted messages via an antenna 24, and a de-interleaver 26 which preferably stores the incoming frame currently being received. A decoder 28 decodes the incoming frames from de-interleaver 26 preferably using, for some of the frames, a priori data received from a filter unit 27. After accumulating an entire message, which may include a plurality of frames, a single frame or less than a single frame, a CRC checker 30 checks the decoded message from decoder 28 to determine whether the decoding was successful.

For the following description it is assumed that the decoding is performed on a frame of a predetermined fixed length defined by a protocol under which receiver 20 operates. The length of the frame is typically 384 symbols which is equivalent to an original message of 192 bits and a reception time of 20 ms. This assumption, however, is not necessary and conditions under which it is not required will be described below.

Receiver 20 also includes control circuitry 44, implemented for example by a Digital Signal Processor (DSP) with appropriate software, which instructs decoder 28 when to begin decoding a frame currently being received. In order to save time, at least some of the frames received by receiver 20 are preferably decoded before de-modulator 22 received the entire frame, and the decoding is performed without received values for at least some of the symbols of the frame. Further preferably, the decoding is finished before the entire frame is received. Control circuitry 44 preferably instructs de-interleaver 26 and filler unit 27 which data is to be passed to decoder 28 for decoding. Control circuitry 44 preferably determines when decoding is to be performed based on input from a clock 32 as described hereinbelow with reference to FIG. 2. In a preferred embodiment of the present invention, circuitry 44 determines when decoding is to be performed based on results of previous decodings from decoder 28 and CRC checker 30. Alternatively or additionally, circuitry 44 determines when decoding is to be performed based on channel quality indications estimated internally by circuitry 44 and/or received from de-modulator 22, decoder 28, and/or other components (not shown) of receiver 20. Such channel quality indications include, for example, the reception power of the signals received by receiver 20, a bit error rate (BER) and/or a frame error rate.

It is noted that FIG. 1 shows only those components which are required for the below explanation, and that receiver 20 may include various other components known in the art. It is further noted that some of the components of receiver 20 shown in FIG. 1 may be implemented by a plurality of sub-components or may be part of a single physical component which includes other components of receiver 20. For example, in some preferred embodiments of the invention, filler unit 27 is an integral part of decoder 28 and/or of de-interleaver 26. The components shown in FIG. 1 are well known in the art, and a person skilled in the art will readily know how to produce receiver 20 based on the following description.

Figure 2:
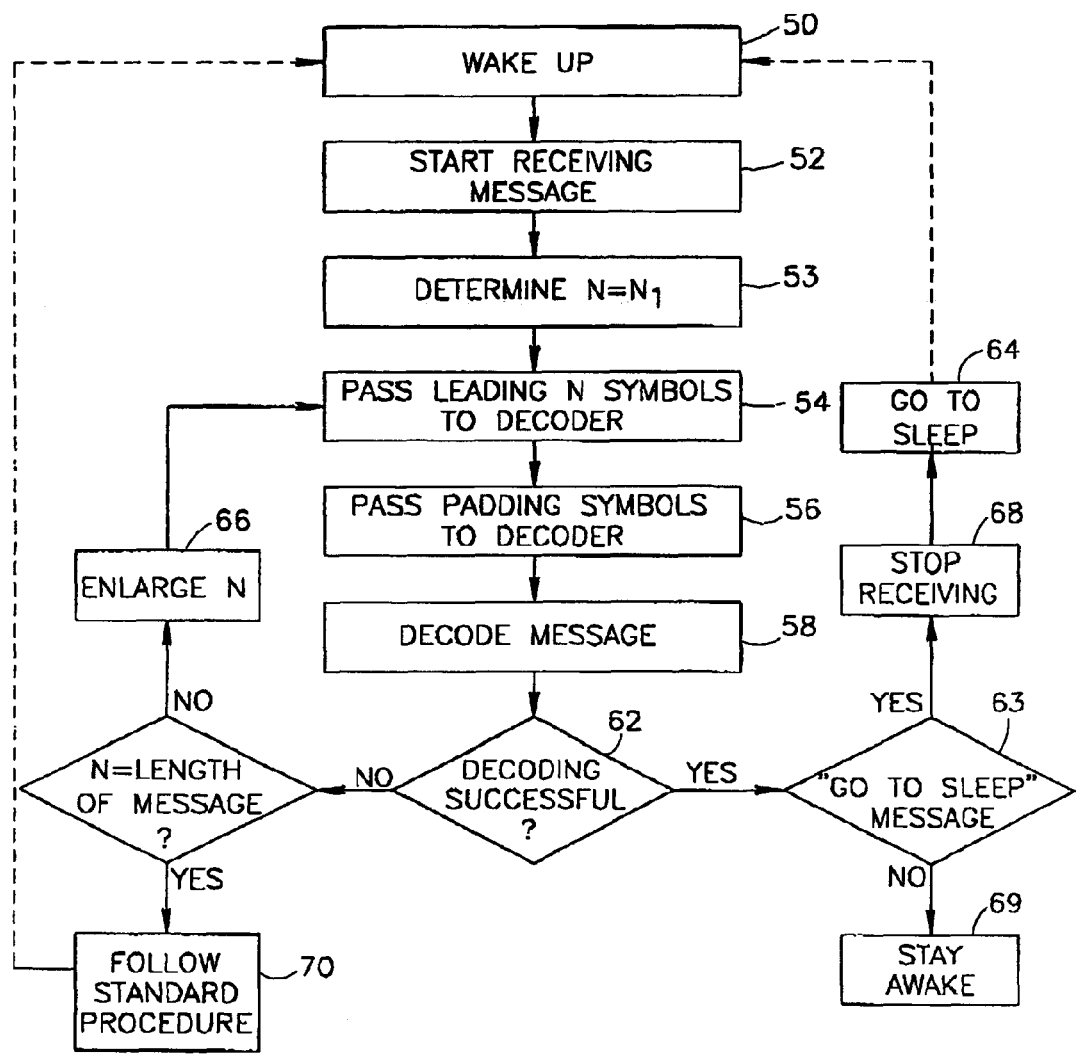
FIG. 2 is a flow chart of the actions performed by the receiver of FIG. 1, in accordance with a preferred embodiment of the present invention.

FIG. 2 is a flow chart of the actions performed by receiver 20 during an idle mode, in accordance with a preferred embodiment of the present invention. In the idle mode, receiver 20 wakes up periodically, at predetermined times, in order to receive a control message from a base station. The control message informs receiver 20 whether it is to receive an incoming message or return to sleep. The control message is typically shorter than the length of a single frame and is included within a single frame. The awakening periods in which the control message are received are responsible for most of the power consumption of receiver 20 during the idle mode. Therefore, it is an aspect of some preferred embodiments of the present invention to minimize the average length of the awakening periods.

When a message from the base station to receiver 20 is due, clock 32, or a different clock controlling receiver 20, wakes up (50) the components of receiver 20. De-modulator 22 begins to receive (52) a frame and store it in de-interleaver 26. A number of symbols N=$N_1$ to be used in a first attempt to decode the frame is determined (53). Once the leading N symbols of the frame have been received, they are preferably passed (54) to decoder 28. In addition, unit 27 preferably provides (56) decoder 28 with a priori values of padding symbols which complete the N symbols to the full predetermined size of the frame as defined by the protocol governing the operation of receiver 20. Decoder 28 then decodes (58) the frame using the N received symbols and the padding symbols. Concurrently, de-modulator 22 preferably continues to receive the transmitted symbols of the rest of the frame and store them in de-interleaver 26. CRC checker 30 preferably determines (62) whether the message was successfully decoded. If (63) the message was successfully decoded and the message is a "go to sleep" message, de-modulator 22 stops (68) receiving incoming symbols and receiver 20 shuts down (64) its components and waits for another awakening (50). If the message is a "stay awake" message, i.e., does not include "go to sleep" bits, receiver 20 stays awake (69) and preferably continues to receive the transmitted signals.

If, however, the decoding failed, the value of N is enlarged (66) and receiver 20 returns to step 54, passing the larger number N of symbols to decoder 28. This process continues until N is enlarged to the entire number of symbols in the received frame. If the frame is still not successfully decoded, receiver 20 preferably follows (70) a standard procedure known in the art for such cases. For example, receiver 20 receives an additional message in an attempt to either decode the additional message or decode the received message based on the additional message.

Referring back to 53 and 66, decoding 58 is performed x times, using $N_1 < N_2 < N_3 \ldots < N_x$ symbols in each of the decodings. Preferably, the number x of decodings performed and the number of received symbols $N_1, N_2, \ldots, N_x$, are optimized so as to minimize the current consumption of receiver 20. In a preferred embodiment of the present invention, the optimization is performed so as to minimize the average number of symbols required to successfully decode the received frames. By reducing the number of symbols required to decode the frame, the time required to receive the symbols is reduced and therefore the power consumption of receiver 20 is also reduced. In a preferred embodiment of the present invention, the optimization is performed based on an estimation of a minimal decodeable length of the received frames.

Referring to the step 53 of determining the number of symbols $N_1$ for the first decoding attempt, $N_1$ is preferably at least as large as the number of bits in the original frame from which the received frame was encoded. That is, $N_1$ is preferably greater than or equal to the number of bits in the frame without the redundancy introduced by the encoding. For example, if the encoded frame has two symbols to represent each bit in the original frame, $N_1$ is at least half of the number of symbols in the frame. It is noted that in the absence of a priori information on the contents of the frame, it is not possible, according to information theory, to ensure successful decoding of the entire frame using fewer than this number of symbols. In some preferred embodiments, however, such a priori information is available, as described hereinbelow, and therefore $N_1$ is preferably set to less than the number of bits in the original frame.

Preferably, the number of symbols $N_x$ used in the last decoding is equal to the total number of symbols in the received frame. Thus, the performance of receiver 20 is not hampered, since the last decoding uses all the information in the received frame, however an opportunity is gained to achieve this performance in less time.

Alternatively, the number of symbols $N_x$ used in the last decoding is also adjusted in order to further reduce the average reception time. Preferably, $N_x$ is set based on a compromise between reducing the average reception time and maximizing the percentage of successful decodings. In a preferred embodiment of the present invention, $N_x$ is chosen so as to achieve a predetermined level of successful decodings, preferably, the minimal percentage of successful decodings allowed by a system in which receiver 20 operates.

In a preferred embodiment, the number of decoding attempts x performed is the maximal number possible, assuming decoder 28 cannot perform two decodings concurrently. For example, in an exemplary embodiment for which receiving the entire frame takes about 20 milliseconds, decoding takes about 2 milliseconds, and the encoding doubles the length of the original frame, six decodings are performed, with numbers of received symbols $N_1, N_2, \ldots$, and $N_x$ equivalent to reception times of 10, 12, 14, 16, 18 and 20 milliseconds. By maximizing the number of decoding attempts, the maximal time waste due to the difference between the minimal decoding length of any specific frame and the actual length used in successful decoding of the frame, is minimized. In the above example, the maximal waste is 2 milliseconds. In a preferred embodiment, receiver 20 comprises one or more additional decoders (not shown) which perform the decoding concurrently with decoder 28 as to reduce the maximal time waste below the minimum for a single decoder.

Alternatively, the number of allowed decodings x is limited to prevent wasteful current consumption required by decoder 28 in order to perform the decoding. In a preferred embodiment of the present invention, only two decodings are performed, a first decoding on fewer symbols than the entire frame and a second decoding using the symbols of the entire frame if the first decoding failed.

In another preferred embodiment of the present invention, only a single decoding attempt is performed. Thus, the apparatus of receiver 20 is simplified. In one variation of this embodiment, de-modulator 22 ignores the signals which are transmitted during the operation of decoder 28 and/or does not store the received symbols in de-interleaver 26, because the transmitted symbols will not be used in any event in an additional decoding attempt. In a preferred embodiment, de-modulator 22 remains tuned to the channel during the decoding, so that it will not need to warm up and synchronize again if the received message is a stay awake message.

In a preferred embodiment of the present invention, x, $N_1$, $N_2, \ldots$, and $N_x$ are predetermined numbers preferably set by a manufacture or installer or receiver 20. The values of x, $N_1, N_2, \ldots$, and $N_x$ are preferably set based on average channel conditions in which receiver 20 is used. Alternatively, a user of receiver 20 selects an operation mode from a plurality of possibilities based on the channel conditions in which the receiver currently operates (for example, signal strength).

Alternatively or additionally to setting predetermined symbol numbers for the decodings, one or more of x, $N_1$, $N_2, \ldots$, and $N_x$ are adaptively adjusted according to the state of the channel to which receiver 20 is listening. In a preferred embodiment, circuitry 44 receives, for example from demodulator 22, an estimate of a quality indicator of the channel, such as the signal to noise ratio (SNR). One or more of x, $N_1, N_2, \ldots N_x$ are then preferably determined responsive to the quality indicator. For example, when the channel has a high SNR, $N_1$ is the minimal possible number because decoding should be easy, while for low SNR, $N_1$ is larger.

Alternatively or additionally, circuitry 44 keeps track of the number of symbols required for successful decoding of previous frames and determines one or more of x, $N_1$, $N_2, \ldots$, and $N_x$ accordingly. For example, if decoder 28 continuously succeeds for a long period to decode the received frames using a number of received symbols n, receiver 20 attempts decoding the received frames using fewer than n symbols. If the decoding with the fewer signals is successful over a predetermined period, receiver 20 continues to decode incoming frames using the fewer number of symbols. Otherwise, receiver 20 returns to performing the decoding using n symbols. In another example, if decoder 28 has a large percentage of unsuccessful decodings using n symbols, receiver 20 attempts to decode the frame using more than n symbols.

Further alternatively or additionally, one or more of N1, $N_2, \ldots, N_x$ are adaptively adjusted according to a margin of success or failure of one or more decodings of previous frames. For example, if previous decodings using n symbols were successful with high confidence (large margins), attempts are made to decode the received frames using fewer than n symbols. If, however, the previous decodings were successful but with only low confidence (small margins), attempts are not made to decode using fewer than n symbols. Preferably, the change in the number of symbols used for decoding is determined based on the margins of the previous decodings. In a preferred embodiment of the present invention, one or more of $N_1, N_2, \ldots, N_x$ are set so as to achieve a predetermined average confidence level for successful decodings using the $N_1, N_2, \ldots$, and $N_x$ symbols.

In a preferred embodiment of the present invention, decoder 28 decodes convolutional codes with a Viterbi style decoder, as described, for example, in chapter 6.2 of "Error-Correction Coding for Digital Communications", by G. C. Clark and J. Bibb Cain, Plenum press, march 1988 and in Forney, G. D., Jr. (1972), "Maximum-Likelihood sequence Estimation of Digital Sequences in the Presence of Intersymbol Interference", IEEE Trans. Inform. Theory, Vol. IT-18, pp. 363–378, the disclosures of which are incorporated herein by reference. Preferably, the failure and success margins are determined based on a comparison of the survival path metric to the runner-up path metric. Alternatively or additionally, the success margins are determined by comparing the survival path metric to the sum of the absolute values of the metrics of all the symbols, i.e., the highest metric of a path of the received frame regardless of whether the path is legal.

In some preferred embodiments of the present invention, the values of one or more of x, $N_2, \ldots$, and $N_x$ are adjusted based on the failure margins of previous decodings of the current frame. For example, if the first decoding failed with a very small margin, the second decoding attempt is performed as soon as possible. However, if the first decoding failed with a large margin, the next decoding attempt is performed at a later time.

Figure 3:
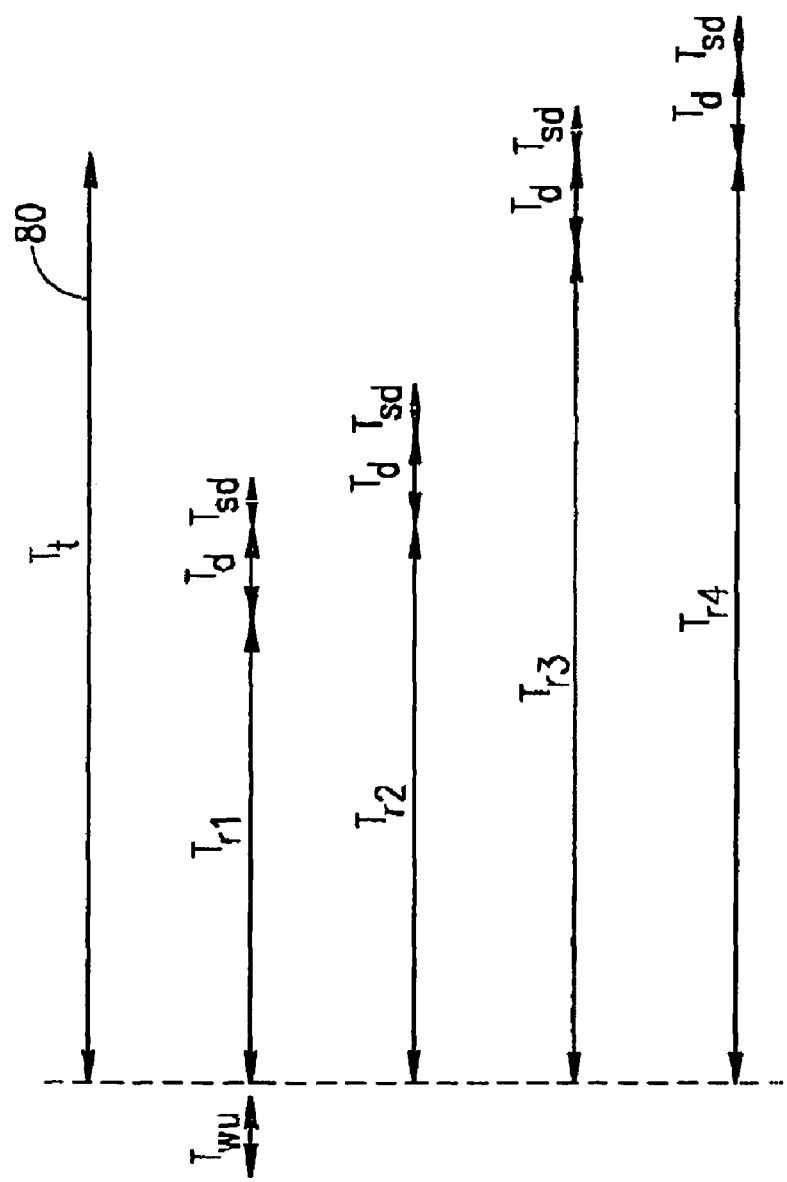
FIG. 3 is a schematic graph of the operation timings of the receiver of FIG. 1, in accordance with a preferred embodiment of the present invention.

FIG. 3 is a schematic graph of exemplary operating times of receiver 20, in accordance with a preferred embodiment of the present invention. Line 80 represents the transmission time $T_t$ of a conventional frame transmitted from a base station to receiver 20. In order to receive the frame, receiver 20 warms up during a period $T_{wu}$ before the beginning of the transmission $T_t$. Thereafter, receiver 20 begins to receive the frame. After a period $T_{r1}$, receiver 20 attempts to decode the frame, using the $N_1$ symbols received during $T_{r1}$, while continuing to receive the rest of the frame. The decoding is performed during a period $T_d$. If the decoding was successful and the message in the frame is a go to sleep message, receiver 20 shuts down, during a period $T_{sd}$. The total time in which receiver 20 is awake in this case is therefore $T_{wu}+T_{r1}+T_d+T_{sd}$. If the decoding was not successful, another decoding attempt is performed using the symbols of the frame accumulated during $T_{r2}$. Likewise, if the second decoding fails, additional attempts are performed using the symbols accumulated during $T_{r3}$ and if necessary during $T_{r4}$.

In the embodiment of FIG. 3 the decoding performed during $T_d$ begins only after the end of the reception time $T_{r1}$, $T_{r2}$, $T_{r3}$ and $T_{r4}$ of the received data used in the decoding. In this embodiment, the decoding period $T_d$ may begin before the end of the transmission time $T_t$ and end after the end of $T_t$. In such a case the decoding uses less received data and therefore receiver 20 spends less time on receiving the data than decoding using all the received data would require. In other embodiments described hereinbelow, the reception time is at least partially parallel to the decoding time $T_d$ and the decoding uses the data received during the decoding. In these other embodiments, at least one of the decodings ends before the end of the transmission time $T_t$.

Preferably, the decoding is performed on a part of the frame which is of a length sufficient to represent a commonly transmitted go to sleep message type, rather than on all the symbols in the frame. Thus, the decoding time $T_d$ is shorter than required in order to decode the entire frame.

In an exemplary case, $T_t$ is 20 milliseconds, $T_d$ is 2 milliseconds and $T_{wu}$ and $T_{sd}$ are 1 milliseconds each. If setting $T_{r1}$, $T_{r2}$, $T_{r3}$ and $T_{r4}$ to 10, 12, 18 and 20 milliseconds achieves a state in which 20% of the go to sleep messages are successfully decoded in the first attempt, 40% in the second attempt, 15% in the third attempt, and 25% in the fourth attempt, the average awakening time of receiver 20 equals:

$T_{wu}+T_d+T_{sd}+0.2*T_{r1}+0.4*T_{r2}+0.15*T_{r3}+0.25*T_{r4}=18.5$ milliseconds.

In contrast, if the decoding is always performed after the entire frame is received, as suggested by the prior art, the time for which receiver 20 is awake is 24 milliseconds. Thus, a saving of nearly 23% is achieved in the time in which receiver 20 is awake, leading to a similar increase in the amount of time receiver 20 operates without recharging or replacing its battery. As described above, the values of $T_{r1}$, $T_{r2}$, $T_{r3}$ and $T_{r4}$ are preferably optimized to achieve a maximal saving in power consumption substantially without hampering the successful decoding rate of receiver 20.

It is noted that the above comparison is based on the assumption that substantially all the go to sleep messages are successfully decoded using the information in the received frame. If this is not the case, the percentage of saving in the time in which receiver 20 is awake is slightly reduced although the absolute saving remains the same.

Referring back to step 56 (FIG. 2) of passing padding symbols to decoder 28, in a preferred embodiment the padding symbols have values which indicate that no information is available about the symbols (in the common convention—zero values). Alternatively or additionally, some or all of the symbols are given values based on predetermined statistics of those symbols. For example, since most messages for which fast decoding is advantageous have the same length, the symbols which represent the length field of the messages usually have the same common value. In a preferred embodiment, those symbols of the length field not received are set to values according to the common value of most messages for which fast decoding is advantageous.

Alternatively or additionally, filler unit 27 keeps track of statistics of the values of the symbols of the received frames and accordingly determines the values of the padding symbols. In a preferred embodiment of the present invention, the statistics are determined based on the successfully decoded frames as received from decoder 28. For example, if a particular symbol has 90% occurrence of being a '1', the padding value of that symbol is assigned a '1' with high confidence (e.g. 28 or 29 out of 31). Preferably, the padding symbols are given less confidence than appears in the statistics in order not to dominate the decoding by the padding data. Alternatively or additionally to gathering the statistics based on the successfully decoded frames, de-modulator 22 receives soft data and the statistics are gathered based on the soft data from de-modulator 22.

In a preferred embodiment of the present invention, the values of the padding symbols are chosen as the values of a specific message type for which it is most important to perform fast decoding. Preferably, if the received message is either of a go to sleep message type or of a stay awake message type, the values of the padding symbols are chosen according to the values of the go to sleep type. Thus, go to sleep messages are decoded relatively fast while the stay awake messages will require additional received symbols. It is noted that using these values imposes, to a certain extent, the go to sleep message type on the received message. However, the CRC check will nearly always detect decoding errors which result from such imposing of message type.

Preferably, the padding symbols from the go to sleep messages are of a high confidence in order to maximize the early detection chances of go to sleep messages. Alternatively, the padding symbols are given an average of low confidence in order to obstruct the dominance of the received data in the decoding. Further alternatively, the confidence of the padding data depends on the ratio between the number of received symbols and the number of padding symbols. When the percentage of padding symbols is relatively large the padding symbols are preferably given relatively low confidence, while when the percentage of padding symbols is relatively large the padding symbols are preferably given relatively high confidence.

In another preferred embodiment of the present invention, receiver 20 includes a plurality of decoders 28 which perform parallel decodings using different padding symbols. For example, if the received message is of one of two major types, receiver 20 employs two decoders 28 which decode the received message using padding symbols which fit the two possible messages, respectively. If one of the decodings is successful that decoding is taken to be correct. If both decodings succeed the decoding with higher confidence is chosen. Alternatively, the decoding is repeated for a larger number of received symbols in order to determine which of the messages is correct.

Figure 4:
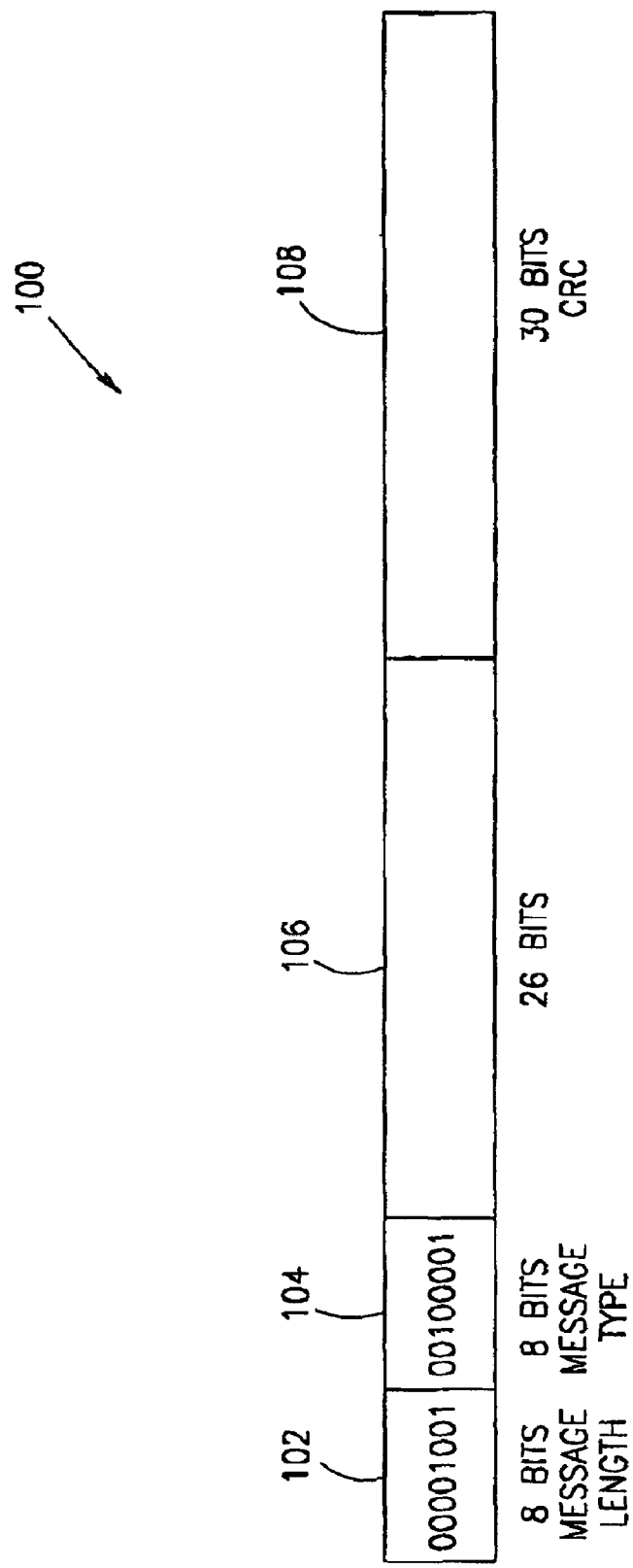
FIG. 4 is a schematic illustration of a structure of a decoded message commonly received by the receiver of FIG. 1, in accordance with a preferred embodiment of the present invention.

FIG. 4 is a schematic illustration of a structure of a decoded message type 100 commonly received by receiver 20, in accordance with a preferred embodiment of the present invention. Message type 100 is a "go to sleep" message type and is estimated to account for a substantial percentage (anywhere between 40–90%) of the messages received by receiver 20 when the receiver is in idle mode. The received messages, regardless of their type, comprise a length field 102 which comprise 8 bits and which represents the number of bytes in the message. In message type 100, field 102 has a value of 9 representing a length of 72 bits. A second field 104 of all the received messages, also containing 8 bits, represents the type of the message. In message 100 field 104 has a value of 33 representing a "general page message" type. The following fields in message 100, represented together by 106, represent various values. Some of these fields have predetermined values as is the case with fields 102 and 104, others have values which may be determined adaptively by receiver 20, for example according to previously received messages, and other fields have values which are not known before the decoding of the message. The remaining part 108 of message 100 is a CRC field of 30 bits.

In a preferred embodiment of the invention, in one or more of the decoding attempts, decoder 28 replaces some or all of the bit values of the fields with known values (e.g., fields 102 and 104), by their respective values in message type 100. In this embodiment, the replacements are preferably performed regardless of the actual values of these fields as received from the decoding. Thus, the chances of decoding the received message if it is of message type 100 is substantially increased while the chances of decoding the message if it is of a different type are substantially reduced. As there is substantially no gain from fast decoding of messages which are not of the type of message 100 and the gain lies in fast decoding of messages of type 100, the above scheme results in reduction in the average power consumption of receiver 20.

In a preferred embodiment of the present invention, the replacement of the decoded values with expected values is performed for all the decoding except the last decoding. Thus, in the last decoding the received messages are not obstructed by the replacements, so that received messages of types other than message type 100 may be decoded. Alternatively, the number of decoding attempts in which values are replaced in adaptively adjusted according to the results of previous decodings of the present message and/or of previous messages. Preferably, replacements are performed in those attempts which have a substantial chance of failure without the replacement.

It is noted that since the CRC is relatively large in message 100 any mistake imposed by the replacement of bit values is almost definitely detected by CRC checker 30. Therefore, the replacement of bit values will not cause a message to be decoded incorrectly.

In a preferred embodiment of the present invention, the bit values of the fields with known values (e.g., fields 102 and 104) are replaced by their values in message 100 only if the decoded values from decoder 28 are similar to the values in message 100. Preferably, the replacement is performed only if the number of bit changes required to change the decoded result to the expected result is smaller than a predetermined number. In a preferred embodiment, the predetermined number for a specific field is between 10–30% of the number of bits in the specific field.

Alternatively, the extent to which the received messages are changed is determined adaptively. Preferably, the extent of changing the received messages is determined so as to maximize the chances of decoding the received message if it is of the expected type. In a preferred embodiment of the present invention, early decodings which have a lower probability of successful decoding without the changes are allowed larger extent of changes in the received symbols. Alternatively, early decodings which are based on relatively a low percentage of the received symbols are allowed only slight changes so as not to cause an erroneous successful decoding.

Preferably, if the number of required bit changes in larger than the allowed number, no changes are made, under the assumption that the received message is not message 100.

In some preferred embodiments of the present invention, only bit values which are liable to relatively high error rates in decoding are replaced by the expected values of message 100. In a preferred embodiment, only the values of length field 102 are replaced by the value in message 100 since decoding errors in length field 102 are frequent relative to other fields.

In some preferred embodiments of the present invention, bit replacements are performed during a single decoding for more than one expected message. For example, if a received message may be of one of five message types replacement is preferably performed for the known values of each of the five types. The message which has a correct CRC, if any such message exists, is considered the correct decoding of the received message. If the CRC is correct for more than one message the decoding is preferably considered unsuccessful.

Alternatively or additionally to replacing the bit values after the decoding, the symbols entering decoder 28 are altered before the decoding. Such altering may be performed irrespective of the received values and/or responsive to the received values.

In a preferred embodiment of the present invention, the soft data values of received symbols which coincide with expected values are raised so as to give them values which represent a higher confidence. For example, received values which are above 0 (representing a '1' value) which for the expected message should be a '1' are raised to values of higher confidence. In a preferred embodiment, the values are raised by a adding a predetermined number to the received value or by adding a certain percentage of the received value. Alternatively, the values are raised to a predetermined high confidence value, preferably the maximal confidence value.

Alternatively or additionally to raising the soft value of received symbols which coincide with the expected message, the confidence of received symbols which do not fit the received message is reduced.

In some preferred embodiments of the present invention, determining whether the message was successfully decoded (62) is performed using methods other than CRC in addition to, or instead of, using the CRC check. Such methods include, for example, other error detection codes such as parity checks and block code checks, and a comparison of the received code to a closed group of possible messages.

It is noted that in some preferred embodiments of the present invention, the CRC is used to correct errors in addition to detecting errors. In these embodiments a decoding is preferably considered to have failed only if the CRC was not able to correct the error. That is, if the CRC check failed but the error was corrected the decoding is considered as being successful.

Although in the above description an example was given in which decoder 28 operates on Viterbi style codes, decoder 28 may operate in accordance with substantially any other code in which redundancy is introduced into the received message, such as turbo style codes, and linear and/or non linear block codes.

In some preferred embodiments of the present invention, receiver 20 receives messages which are not necessarily of the same length. Therefore, in receiving a specific message, receiver 20 does not know its length. Preferably, receiver 20 decodes a first frame of the message, the length of the first frame being based on a protocol agreement between the transmitting base station and receiver 20. That is, receiver 20 selects $N_1, N_2, \ldots,$ and $N_x$ and adds padding symbols based on the length of the first frame rather than the length of the message which is as yet unknown. Upon decoding this frame, receiver 20 reads a length field of the message which states the length of the entire message. If the length is the length of the first frame or shorter, as is commonly the case, no additional processing is necessary. If, however, the message is longer than the first frame, receiver 20 preferably continues in receiving and decoding a second frame of a predetermined length, or of the remaining length of the message. Alternatively to decoding a second frame, the entire message (including the first frame which was already decoded) is decoded using the method of FIG. 2 and the length of the entire message. In some cases, using the received symbols of the first frame (which was already successfully decoded) in decoding the rest of the message, raises the chances of successfully decoding the rest of the message.

It is noted, that the above described preferred embodiments are not limited to any specific message length or to any one frame length. Rather, the method of FIG. 2, for example, and its variants, may be used on messages of substantially any length. Furthermore, a single receiver may use the principles of the present invention on messages of different lengths and/or on messages received on different channels.

Although the above description relates to a decoder 28 which begins decoding only after all the data in the decoded frame is received, or which, as described above, receives padding data instead of the data not received, the principles of the present invention are applicable to decoders which decode the message while it is being received, and finish decoding after all the symbols in the message were received. Such decoders are preferably included in a receiver which does not perform external interleaving, but rather performs internal interleaving as performed, for example, on turbo style codes. In accordance with preferred embodiments of the present invention, in these decoders the decoding process begins such that the decoding ends before the entire message is received. Instead of the symbols not received padding symbols are introduced.

In a preferred embodiment of the present invention, the method of FIG. 2 is implemented on those messages for which there is an advantage in reducing the reception time of the message. In a preferred embodiment of the present invention, the method of FIG. 2 is performed when the receiver is in idle mood. Alternatively or additionally, the method of FIG. 2 is implemented on messages which may indicate in a substantial probability that the receiver should go to sleep. Additionally, the method of FIG. 2 is preferably implemented on messages after which the receiver is to go to sleep in a substantially probability even if the messages do not relate to the operation of the receiver.

In a preferred embodiment of the present invention, receiver 20 is part of a cellular phone. In this embodiment, the method of FIG. 2 is preferably implemented on the messages received on a paging channel. Alternatively, the method of FIG. 2 is implemented on all the non-audio messages.

Alternatively or additionally, receiver 20 is included in any other communication terminal, for example, in a pager. Preferably, the method of FIG. 2 is implemented on all the messages received by the pager.

It will be appreciated that the above described methods may be varied in many ways, including, changing the order of steps, and the exact implementation used. It should also be appreciated that the above described description of methods and apparatus are to be interpreted as including apparatus for carrying out the methods and methods of using the apparatus.

The present invention has been described using non-limiting detailed descriptions of preferred embodiments thereof that are provided by way of example and are not intended to limit the scope of the invention. Variations of embodiments described will occur to persons of the art. Furthermore, the terms "comprise," "include," "have" and their conjugates, shall mean, when used in the claims, "including but not necessarily limited to." The scope of the invention is limited only by the following claims.

What is claimed is:

1. A method comprising:
   receiving by a communication terminal an encoded message;
   de-interleaving a portion of the encoded message to provide a de-interleaved message;
   decoding the encoded message, by combining the de-interleaved message with a priori data based on an expected content of the encoded message, to provide a decoded message; and
   determining whether or not to move the communication terminal to a sleep condition based on a constant of the decoded message.

2. A method according to claim 1, wherein receiving comprises receiving symbols over a paging channel.

3. A method according to claim 1, wherein the decoding is completed before receiving all symbols of the encoded message.

4. A method according to claim 1, wherein the decoding is performed using a predetermined number of received symbols.

5. A method according to claim 1, wherein the decoding is performed using an adaptively adjusted number of received symbols.

6. A method according to claim 5, wherein the decoding comprises decoding using a number of received symbols adjusted responsive to an estimate of the quality of a channel over which the encoded message is received.

7. A method according to claim 5, wherein decoding using the adaptively adjacent number of symbols comprises decoding using a number of received symbols adjusted responsive to a rate of decoding successes of previously received messages.

8. A method according to claim 5, wherein the decoding comprises decoding using a number of received symbols adjusted responsive to a confidence margin of one or more previous decoding.

9. A method according to claim 1, wherein the decoding comprises decoding using the lowest number of received symbols which ensures a predetermined rate of success in decoding the encoded message.

10. A method according to claim 1, comprising:
    receiving symbols of the encoded message while decoding the content of the message.

11. A method according to claim 10, comprising decoding the encoded message a second time using more received symbols than used in the previous decoding.

12. A method according to claim 11, wherein decoding the encoded message the second time is performed only if the first decoding failed.

13. A method according to claim 11, wherein decoding the encoded message the second time comprises using a number of received symbols determined responsive to results of the previous decoding.

14. A method according to claim 1, wherein receiving the symbols comprises receiving during an idle mode of the communication terminal.

15. A method comprising:
    receiving at a communication terminal symbols of a frame of an encoded message over a translation channel;
    determining a number of received symbols responsive to the channel on which the symbols are received;
    de-interleaving the determined number of symbols to provide a de-interleaved message; and
    decoding the frame by combining the de-interleaved message with a priori data related to a stored content of a successfully decoded message.

16. A method according to claim 15, wherein determining the number of received symbols comprises determining the number of received symbols responsive to whether the communication terminal is in idle mood.

17. A method according to claim 15, wherein determining the number of received symbols comprises determining the number of received symbols responsive to success rates in decoding previously received frames.

18. A method according to claim 15, wherein determining the number of received symbols comprises determining fewer symbols than a total number of symbols in the frame.

19. A receiver comprising:
  a demodulator to provide a quality indicator based on received symbols of a frame of a transmitted encoded message;
  control circuitry to determine based on the quality indicator a number of received symbols of the frame to be used in decoding the frame,
  a de-interleaver unit to de-interleave the determined number of symbols;
  a filler unit to provide padding symbols based on an expected content of the frame; and
  a decoder to decode the frame based on the determined number of symbols provided by the de-interleaver unit and the padding symbols provided by the filler unit.

20. A receiver according to claim 19, wherein the filler provides the padding symbols based on accumulated statistic of values of received frames.

21. A method comprising:
  receiving encoded symbols of a frame of a transmitted encoded message;
  de-interleaving a portion of the received symbols of the frame to provide de-interleaved received symbols;
  altering the values of at least one of the received symbols of the frame, based on a prior data, to correspond to values of an expected message type; and
  decoding the frame based on the altered values and the de-interleaved received symbols.

22. A method according to claim 21, wherein receiving the encoded symbols comprises receiving fewer than the number of symbols in the frame.

23. A method according to claim 21, wherein altering the values of at least one of the symbols comprises altering irrespective of the received values.

24. A method according to claim 21, wherein altering the values of at least one of the symbols comprises altering responsive to the received values.

25. A method according to claim 24, wherein the received encoded symbols comprise soft data and wherein altering the values of at least one of the symbols comprises raising the confidence values of symbols whose values coincide with values of an expected message type.

26. A method according to claim 24, wherein the received encoded symbols comprise soft data and wherein altering the values of at least one of the symbols comprises lowering the confidence values of symbols whose values do not coincide with values of an expected message type.

27. A method according to claim 21, wherein altering the values of at least one of the symbols comprises altering the values provided the frame is altered less than an allowed extent.

28. A method according to claim 27, wherein altering the values of at least one of the symbols comprises determining a number of symbols which are to be altered and altering the frame only if the determined number of symbols is lower than an allowed number.

29. A method according to claim 21, comprising checking the decoded frame based on an error detection code to determine whether the decoding was successful.

30. A method according to claim 29, comprising performing an additional decoding attempt if the decoding was not successful.

31. A method according to claim 30, wherein the additional decoding attempt is performed without altering values of any of the symbols.

* * * * *